United States Patent
Kuo et al.

(10) Patent No.: US 8,780,292 B2
(45) Date of Patent: Jul. 15, 2014

(54) LIQUID CRYSTAL DISPLAY AND BACKLIGHT MODULE AND FRAME UNIT THEREOF

(75) Inventors: Yi-cheng Kuo, Guandong (CN);
Yu-chun Hsiao, Guandong (CN);
Chengwen Que, Guandong (CN);
Pangling Zhang, Guandong (CN);
Dehua Li, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 100 days.

(21) Appl. No.: 13/642,531

(22) PCT Filed: Sep. 6, 2012

(86) PCT No.: PCT/CN2012/081033
§ 371 (c)(1),
(2), (4) Date: Oct. 21, 2012

(87) PCT Pub. No.: WO2014/032320
PCT Pub. Date: Mar. 6, 2014

(65) Prior Publication Data
US 2014/0063401 A1 Mar. 6, 2014

(51) Int. Cl.
*G02F 1/1333* (2006.01)
(52) U.S. Cl.
USPC ............... 349/58; 349/65; 362/632; 362/97.2

(58) Field of Classification Search
CPC ............ G02F 1/133608; G02F 1/1333; G02F 1/133308; G02F 1/1336; G02F 1/133603; G02F 1/133524; G02B 6/0088; G02B 6/0085
USPC ............ 349/58, 65; 362/611, 97.1, 612, 615, 362/97.2, 632, 633; 361/752, 807; 312/7.2, 312/223.5; 348/790
See application file for complete search history.

(56) References Cited

U.S. PATENT DOCUMENTS

2012/0188790 A1* 7/2012 Isobe ........................... 362/602

* cited by examiner

*Primary Examiner* — Thoi Duong
(74) *Attorney, Agent, or Firm* — Andrew C. Cheng

(57) ABSTRACT

The present invention discloses a liquid crystal display and a backlight module and a frame unit thereof. The frame unit includes a holder part and an intermediate frame. The holder part is provided with a supporting portion and a vertical portion. The supporting portion supports the light guide plate, and the mating portion is disposed on the side of the vertical portion away from the supporting portion. The mating portion is provided with a mating face, and the mating face tilts from the side of the vertical portion close to the light guide plate to the side of the vertical portion away from the light guide plate. The intermediate frame presses against the light guide plate, and an inverted U-shaped groove is disposed on the intermediate frame. A mating portion is disposed in the inverted U-shaped groove, and a mating face abuts on the inner surface of the inverted U-shaped groove close to the light guide plate. The present invention can solve the eversion problem of the intermediate frame of the liquid crystal display.

19 Claims, 2 Drawing Sheets

LIQUID CRYSTAL DISPLAY AND BACKLIGHT MODULE AND FRAME UNIT THEREOF

FIELD OF THE INVENTION

The present invention relates to the field of liquid crystal, and specifically relates to a liquid crystal display (LCD) and a backlight module and a frame unit thereof.

BACKGROUND OF THE INVENTION

In the prior art, LCD assembly are many ways of which the liquid crystal panel is disposed on the backlight module. The light guide plate is disposed on the supporting portion of the backplane unit, and the intermediate frame of the backlight module presses against the light guide plate for fixing the light guide plate. However, in the use of the LCD, a counterforce may be applied by the light guide plate due to the intermediate frame presses against the light guide plate. The intermediate frame may have eversion by the counterforce and may damage the LCD.

SUMMARY OF THE INVENTION

The embodiment of the present invention is to provide an LCD and a backlight module and a frame unit, which can solve the eversion problem of the intermediate frame in the use of the LCD.

In order to solve the above-mentioned problems, technical solution disclosed in the present invention is: to provide an LCD, the LCD comprises: a liquid crystal panel; a light source; a light guide plate; and a frame unit. The frame unit includes a holder part and an intermediate frame. The holder part is provided with a supporting portion and a vertical portion interconnected with each other. The supporting portion supports the light guide plate of the LCD. A mating portion is disposed on one side of the vertical portion away from the supporting portion. A mating face is provided on one side of the mating portion close to the light guide plate. The mating face tilts from the side of the vertical portion close to the light guide plate to the side of the vertical portion away from the light guide plate. The light guide plate is pressed by one end of the intermediate frame close to the light guide plate. An inverted U-shaped groove is provided on the part of the intermediate frame close to the holder part. The mating portion is disposed in the inverted U-shaped groove. The mating face abuts on the inner surface of the inverted U-shaped groove close to the side of the light guide plate. The light source is disposed on the vertical portion. The light guide plate is disposed on the supporting portion. A bearing portion is disposed on the intermediate frame, and liquid crystal panel is disposed on the bearing portion.

Wherein, the mating face is flat or curved.

Wherein, the holder part is made of aluminum.

Wherein, the assembly angle is provided on the top of the mating portion close to one side of the light guide plate.

Wherein, the hook engagement portion is provided on the side of the mating portion away from the light guide plate, and the hook groove is provided on the part of the inverted U-shaped groove away from the light guide plate, and the hook groove hooked with the hook engagement portion.

Wherein, the side of the mating portion away from the supporting portion matches tightly with the inner surface of the inverted U-shaped groove.

Wherein, the supporting portion and the vertical portion are formed integrally.

In order to solve above-mentioned problems, another technical solution disclosed in the present invention is: to provide a backlight module, the backlight module comprises: a light source; a light guide plate; and a frame unit. The frame unit includes a holder part and an intermediate frame. The holder part is provided with a supporting portion and a vertical portion interconnected with each other. The supporting portion supports the light guide plate of the LCD. A mating portion is disposed on one side of the vertical portion away from the supporting portion. A mating face is provided on one side of the mating portion close to the light guide plate. The mating face tilts from the side of the vertical portion close to the light guide plate to the side of the vertical portion away from the light guide plate. The light guide plate is pressed by one end of the intermediate frame close to the light guide plate. An inverted U-shaped groove is provided on the part of the intermediate frame close to the holder part. The mating portion is disposed in the inverted U-shaped groove. The mating face abuts on the inner surface of the inverted U-shaped groove close to the side of the light guide plate.

Wherein, the light guide plate is disposed on the supporting portion, and the light source is disposed on the vertical portion.

Wherein, the mating face is flat or curved.

Wherein, the holder part is made of aluminum.

Wherein, the assembly angle is provided on the top of the mating portion close to one side of the light guide plate.

Wherein, the hook engagement portion is provided on the side of the mating portion away from the light guide plate, and the hook groove is provided on the part of the inverted U-shaped groove away from the light guide plate, and the hook groove hooked with the hook engagement portion.

Wherein, the side of the mating portion away from the supporting portion matches tightly with the inner surface of the inverted U-shaped groove.

In order to solve above-mentioned problems, another technical solution disclosed in the present invention is: to provide a frame unit using in LCD, the frame unit comprises: a holder part; and an intermediate frame. The holder part is provided with a supporting portion and a vertical portion interconnected with each other. The supporting portion supports the light guide plate of the LCD. A mating portion is disposed on one side of the vertical portion away from the supporting portion. A mating face is provided on one side of the mating portion close to the light guide plate. The mating face tilts from the side of the vertical portion close to the light guide plate to the side of the vertical portion away from the light guide plate. The light guide plate is pressed by one end of the intermediate frame close to the light guide plate. An inverted U-shaped groove is provided on the part of the intermediate frame close to the holder part. The mating portion is disposed in the inverted U-shaped groove. The mating face abuts on the inner surface of the inverted U-shaped groove close to the side of the light guide plate.

Wherein, the mating face is flat or curved.

Wherein, the holder part is made of aluminum.

Wherein, the assembly angle is provided on the top of the mating portion close to one side of the light guide plate.

Wherein, the hook engagement portion is provided on the side of the mating portion away from the light guide plate, and the hook groove is provided on the part of the inverted U-shaped groove away from the light guide plate, and the hook groove hooked with the hook engagement portion.

Wherein, the side of the mating portion away from the supporting portion matches tightly with the inner surface of the inverted U-shaped groove.

In one embodiment of the present invention, the inclined mating face is provided on the mating portion of the holder part of the LCD, and said mating face abuts on the inner surface of the inverted U-shaped groove of the intermediate frame. When the intermediate frame extrudes toward the light guide plate, the light guide plate may apply the upward direction counterforce F1 which is perpendicular to the light guide plate to the intermediate frame, and the intermediate frame will reverse away from one direction of the light guide plate. It may make the inverted U-shaped groove of the intermediate frame extrude the mating face. Because the mating face tilts from the side of the holder part close to the light guide plate to the side of the holder part away from the light guide plate, the holder part may apply the downward direction counterforce F2 which is inclined to the light guide plate to the intermediate frame. The counterforce F1 and the counterforce F2 are mutually balanced, and the intermediate frame may not reverse due to the counterforce of the light guide plate.

BRIEF DESCRIPTION OF DRAWINGS

In order to more clearly illustrate the technical solution disclosed in the preferred embodiment of the present invention, the following drawings are introduced for simply describing the preferred embodiment. Obviously, the following drawings are only to illustrate some embodiments of the present invention. For the ordinary skill in the art is concerned, under the premise of without creative effort, the other drawings can also be obtained according to these drawings.

DETAILED DESCRIPTION OF PREFERRED EMBODIMENT

In the following detailed description of the present invention, reference is made to the accompanying drawings and the preferred embodiments. The following embodiments are used to illustrate the present invention but should not be used to limit the scope of the present invention.

Figure 1:
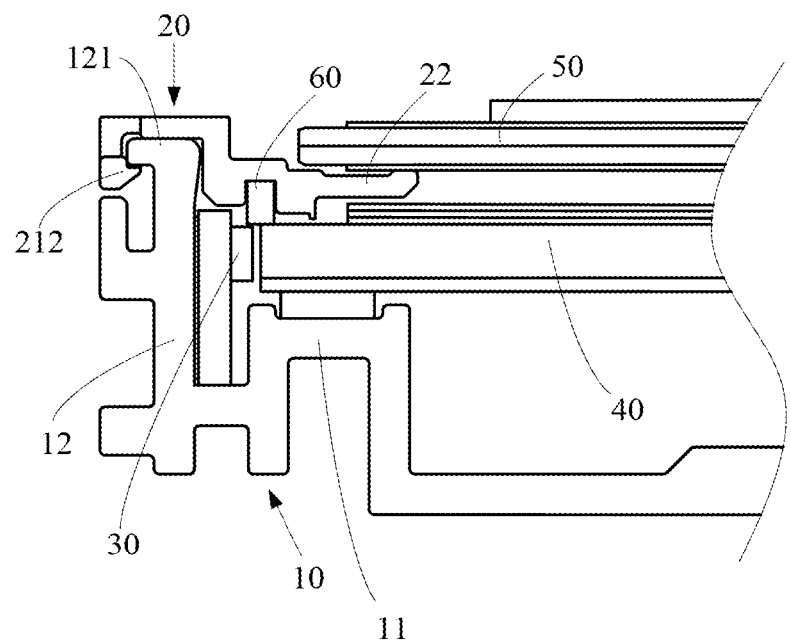
FIG. 1 is a structure view showing the frame unit of the LCD in accordance with one embodiment of the present invention.
Figure 2:
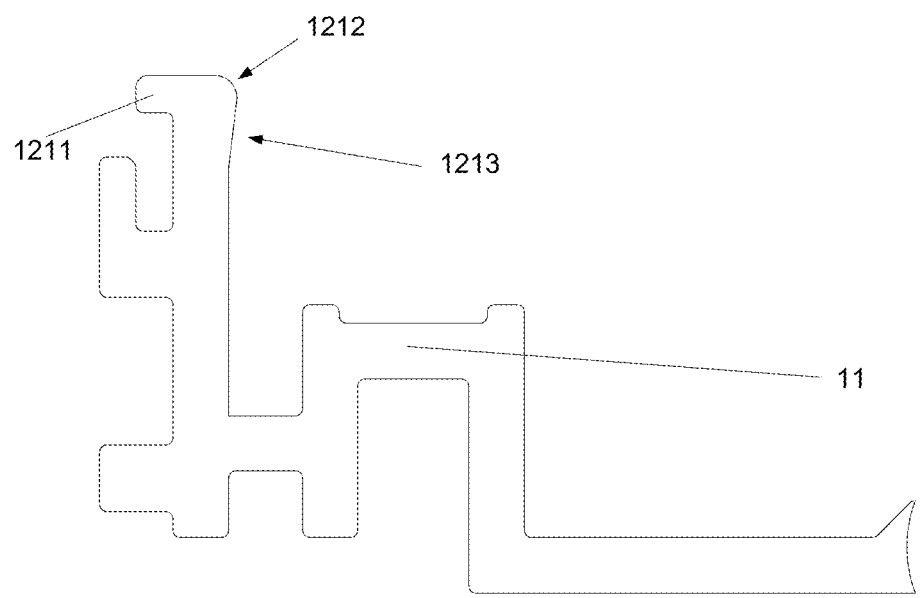
FIG. 2 is a structure view showing the holder part of the frame unit in FIG. 1.
Figure 3:
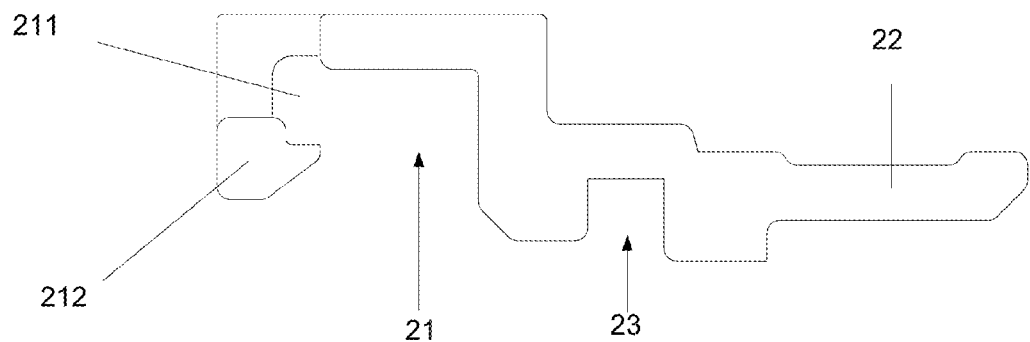
FIG. 3 is a structure view showing the intermediate frame of the frame unit in FIG. 1.

Referring to FIGS. 1, 2, and 3, wherein FIG. 1 is a structure view showing a frame unit of the LCD in accordance with one embodiment of the present invention, and FIG. 2 is a structure view showing a holder part of the frame unit in FIG. 1, and FIG. 3 is a structure view showing an intermediate frame of the frame unit in FIG. 1.

In this embodiment, the frame unit comprises a holder part 10 and an intermediate frame 20, but not limited to.

Preferably, the holder part 10 may be made of aluminum which can enhance the cooling effect of the LCD. The holder part 10 may also be made from other materials having a heat dissipation function, and this is not limited.

Specifically, the holder part 10 comprises a supporting portion 11 and a vertical portion 12. The supporting portion 11 supports the light guide plate 40 of the LCD. A mating portion 121 is provided on the top of the vertical portion 12. The mating portion 121 provides with a hook engagement portion 1211. The hook engagement portion 1211 can be designed as a protrusion which is disposed on the outer surface of the vertical portion 12, but also can be design in other structures, and this is not limited. The top of the mating portion 121 away from the side of the hook engagement portion 1211 is provided with an assembly angle 1212 which can facilitate the assembly of the holder part 10 and the intermediate frame 20. The assembly angle may be rounded or inverted C angle. Below the assembly angle 1212 is provided with a mating face 1213. The mating face 1213 tilts from one side of the vertical portion 12 disposed on the assembly angle 1212 to the side of the vertical portion 12 disposed on the hook engagement portion 1211. The mating face 1213 may be an inclined plane or an inclined curve, and its specific structure may be changed based on the structure of the frame unit. This is not limited in the present invention.

In this embodiment, the supporting portion 11 and the vertical portion 12 interconnect with each other. Be noted, the connection method may be welding or integrally forming or other means. In other words, the connection between the supporting portion 11 and the vertical portion 12 may be changed based on the structural design of the backplane unit. This is not limited in the present invention.

The part of the intermediate frame 20 close to the vertical portion 12 is provided with an inverted U-shaped groove 21. The opening size of the inverted U-shaped groove 21 is matched with the top size of the mating portion 121. It allows the mating portion 121 to put on the inverted U-shaped groove 21. The inverted U-shaped groove 21 further provides with a hook engagement groove 211, and a hook portion 212 is provided on the bottom of the side of the hook engagement groove 211 which is disposed on the inverted U-shaped groove 21. The side of the intermediate frame 20 away from the inverted U-shaped groove 21 is provided with a bearing portion 22 and a press-fit groove 23.

The specific structure of the holder part 10 and the intermediate frame 20 is described above, and the following detailed describes the assembly method of the holder part 10 and the intermediate frame 20.

In this embodiment, the mating portion 121 is disposed in the inverted U-shaped groove 21, and the surface of the mating portion 121 away from the supporting portion 11 is matched tightly with the inner surface of the inverted U-shaped groove 21. The hook portion 212 withstands the lower surface of the hook engagement portion 1211 so that the hook engagement portion 1211 can dispose in the hook engagement groove 211. The mating face 1213 abuts on the inner surface of the inverted U-shaped groove 21 away from the side of the hook engagement groove 211, and it may make the mating portion 121 matched with the inner surface of the inverted U-shaped groove 21 away from the side of the hook engagement groove 211. Of course, it can also be provided with a transition region between the assembly angle 1212 and the mating face 1213. Through the transition region abuts on the inner surface of the inverted U-shaped groove 21 away from the side of the hook engagement groove 211, the mating portion 121 may match with the inner surface of the inverted U-shaped groove 21 away from the side of the hook engagement groove 211. The matching method for the mating portion 121 matched with the inner surface of the inverted U-shaped groove 21 away from the side of the hook engagement groove 211 can be changed based on LCD design, and this is not limited.

In this embodiment, a light source 30 of the LCD is disposed on the vertical portion 12, and its specific connection may be attached to the vertical portion 12 by thermally conductive sealant or screws. The disposed position of the light source 30 and the connection method between the light source 30 and the holder part 10 are not limited.

The light guide plate 40 of the LCD is disposed on the supporting portion 11, specifically, and the side of the supporting portion 11 close to the light guide plate 40 is provided with a cushion (not shown). The light guide plate 40 is disposed on the cushion to achieve a better assembly result. The side of the light guide plate 40 away from the supporting portion 11 abuts on the intermediate frame 20. Preferably, the intermediate frame 20 abuts on the light guide plate 40 by the press-fit member 60 which is an elastic material and disposed in a press-fit groove 23. The matching relation between the press-fit member 60 and the press-fit groove 23 may be interference or in other forms, and this is not limited in the present invention. The bottom of the press-fit member 60 abuts on the light guide plate 40. Therefore, the light guide plate 40 may be fixed between the holder part 10 and the intermediate frame 20.

The liquid crystal panel 50 of the LCD is disposed on a bearing portion 22. The specific structure and the assembly method of the bearing portion 22 with the liquid crystal panel 50 may be changed based on the LCD design, and this is not limited in the present invention.

Figure 4:
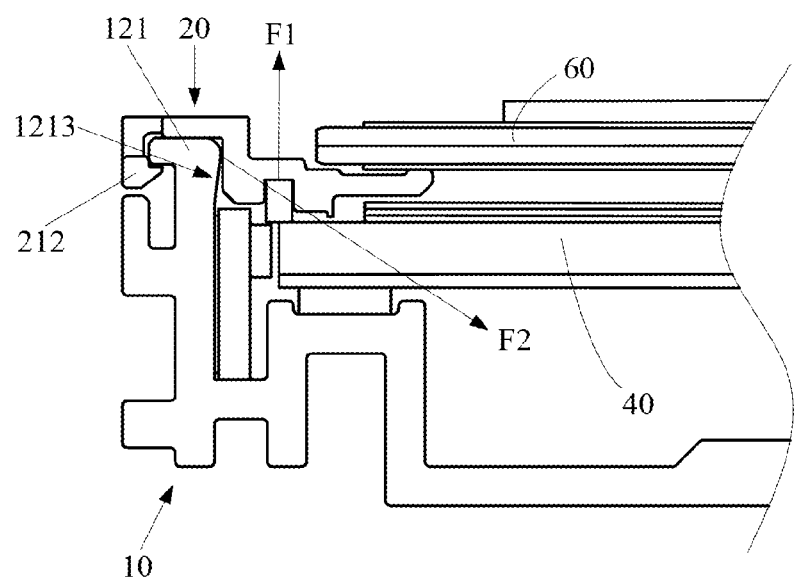
FIG. 4 shows a schematic diagram of the frame unit in FIG. 1, which is illustrating the principle of avoiding the intermediate frame eversion.

The above-mentioned description illustrates the connection relationship between the structure and each member of the frame unit of the LCD in one embodiment of the present invention. The following detailed description combined with FIG. 4 illustrates the principle of avoiding the intermediate frame 20 eversion. FIG. 4 is a schematic diagram of the frame unit in FIG. 1, which is illustrating the principle of avoiding the intermediate frame eversion.

In the use of the LCD, the intermediate frame 20 presses against the light guide plate 40, therefore, the intermediate frame 20 may suffer a counterforce F1 applied by the light guide plate 40, and the counterforce direction is upward which is perpendicular to the plane of the light guide plate 40. After F1 applies to the intermediate frame 20, the intermediate frame may reverse along the direction away from the light guide plate 40. Because the reversal process of the intermediate frame 20 may squeeze the mating face 1213, the intermediate frame 20 may suffer a counterforce F2 applied by the mating face 1213. The counterforce direction is downward which is perpendicular to the mating face 1213, and that is downward inclined to the plane of the light guide plate 40. F2 and F1 are mutually balanced. Therefore, it can ensure that the intermediate frame 20 may not reverse due to the counterforce applied by the light guide plate 40.

In one embodiment of the present invention, the mating portion 121 of the holder part 10 of the frame unit is provided with an inclined mating face 1213, and said mating face 1213 abuts on the inner surface of the inverted U-shaped groove 21 of the intermediate frame 20. When the intermediate frame 20 reverses due to suffering the counterforce F1 applied by the light guide plate 40, the mating face 1213 may apply the force F2 to the intermediate frame 20. It makes the intermediate frame 20 force balanced to avoid the intermediate frame 20 eversion. The holder part 10 can match tightly with the intermediate frame 20 which can effectively avoid the intermediate frame 20 eversion according to the embodiment of the present invention.

Be noted, the above-mentioned is only one embodiment of the present invention. In other embodiments of the present invention, the inverted U-shaped groove is disposed on the vertical portion of the holder part, and the mating portion is disposed on the intermediate frame, and the mating portion is disposed in the inverted U-shaped groove; or a U-shaped groove is provided on the vertical portion, and the mating portion is provided on the intermediate frame, and the mating face is provided on the side of the mating portion away from the light guide plate, and the mating face tilts from the side of the mating portion away from the light guide plate to the side of the mating portion close to the light guide plate. Through the U-shaped groove matched with the mating portion, it can achieve the engagement between the holder part and the intermediate frame. Due to each member structure, the connection method and the principle of avoiding the intermediate frame eversion in other embodiments are substantially the same as the above embodiment, there are no more words to repeat again.

Understandably, because the other embodiments in the present invention also adopt the inclined mating face, it can make good engagement between the holder part and the intermediate frame more tightly and effectively avoid the intermediate frame eversion.

The embodiment of the present invention further provides a backlight module, and the backlight module comprises a light source, a light guide plate and said frame unit, wherein said frame unit includes a holder part and an intermediate frame. As mentioned earlier, the light source is disposed on the vertical portion of the holder part, and the light guide plate is disposed on the supporting portion of the holder part. The top of the vertical portion is provided with a mating portion, and the mating portion is provided with a mating face. An inverted U-shaped groove is disposed on the part of the intermediate frame close to the vertical portion. The mating portion is disposed in the inverted U-shaped groove which can achieve the connection between the holder part and the intermediate frame, wherein the mating face abuts on the inner surface of the inverted U-shaped groove close to the side of the mating portion. Due to each member structure and the connection method of the backlight module has been described the above, there are no more words to repeat again.

Understandably, because the backlight module of this embodiment adopts the frame unit described in the previous embodiment, it can make good engagement between the holder part and the intermediate frame more tightly and effectively avoid the intermediate frame eversion.

The embodiment of the present invention further provides an LCD, and the LCD comprises a liquid crystal panel, and said backlight module described in the previous embodiment, wherein the liquid crystal panel is disposed on a bearing portion of the intermediate frame. The frame unit of the backlight module includes the holder part and the intermediate frame. As mentioned earlier, the light source is disposed on the vertical portion of the holder part, and the light guide plate is disposed on the supporting portion of the holder part. The top of the vertical portion is provided with a mating portion, and the mating portion is provided with a mating face. The inverted U-shaped groove is disposed on the part of the intermediate frame close to the vertical portion. The mating portion is disposed in the inverted U-shaped groove which can achieve the connection between the holder part and the intermediate frame, wherein the mating face abuts on the inner surface of the inverted U-shaped groove close to the side of the mating portion. Due to each member structure and the connection method of the LCD has been described the above, there are no more words to repeat again.

Understandably, because the LCD of this embodiment adopts the frame unit described in the previous embodiment, it can make good engagement between the holder part and the intermediate frame more tightly and effectively avoid the intermediate frame eversion.

The foregoing description of the preferred embodiments of the present invention is not to limit the scope or meaning of the claims of this invention. Any use of the equivalent structure and drawings of the specification or the equivalent process transformation of the present invention, directly or indirectly used in other related technical areas, are the same reason in the present invention within the scope of patent protection.

What is claimed is:

1. A liquid crystal display comprising a liquid crystal panel, a light source, and a light guide plate, wherein said liquid crystal display further comprises a frame unit, said frame unit comprising:
   a holder part, which is provided with a supporting portion and a vertical portion interconnected with each other, wherein said supporting portion supports the light guide plate of said liquid crystal display, and a mating portion is disposed on one side of said vertical portion away from said supporting portion, and a mating face is provided on one side of said mating portion close to said light guide plate, and said mating face tilts from one side of said vertical portion close to said light guide plate to one side of said vertical portion away from said light guide plate; and
   an intermediate frame, wherein said light guide plate is pressed by one end of said intermediate frame close to said light guide plate, and an inverted U-shaped groove is provided on the part of said intermediate frame close to said holder part, and said mating portion is disposed in said inverted U-shaped groove, and said mating face abuts on the inner surface of said inverted U-shaped groove close to one side of said light guide plate, and said light source is disposed on said vertical portion, and a bearing portion is disposed on said intermediate frame, and said liquid crystal panel is disposed on said bearing portion.

2. The liquid crystal display according to claim 1, wherein said mating face is flat or curved.

3. The liquid crystal display according to claim 1, wherein said holder part is made of aluminum.

4. The liquid crystal display according to claim 1, wherein an assembly angle is provided on the top of said mating portion close to one side of said light guide plate.

5. The liquid crystal display according to claim 1, wherein a hook engagement portion is provided on one side of said mating portion away from said light guide plate, and a hook groove is provided on the part of said inverted U-shaped groove away from said light guide plate, and said hook groove hooked with said hook engagement portion.

6. The liquid crystal display according to claim 5, wherein one side of said mating portion away from said supporting portion matches tightly with the inner surface of said inverted U-shaped groove.

7. The liquid crystal display according to claim 1, wherein said supporting portion and said vertical portion are formed integrally.

8. A backlight module comprising a light source, and a light guide plate, wherein said backlight module further comprising a frame unit, said frame unit comprising:
   a holder part, which is provided with a supporting portion and a vertical portion interconnected with each other, wherein said supporting portion supports the light guide plate of said liquid crystal display, and a mating portion is disposed on one side of said vertical portion away from said supporting portion, and a mating face is provided on one side of said mating portion close to said light guide plate, and said mating face tilts from one side of said vertical portion close to said light guide plate to one side of said vertical portion away from said light guide plate; and
   an intermediate frame, wherein said light guide plate is pressed by one end of said intermediate frame close to said light guide plate, and an inverted U-shaped groove is provided on the part of said intermediate frame close to said holder part, and said mating portion is disposed in said inverted U-shaped groove, and said mating face abuts on the inner surface of said inverted U-shaped groove close to one side of said light guide plate, and said light source is disposed on said vertical portion.

9. The backlight module according to claim 8, wherein said mating face is flat or curved.

10. The backlight module according to claim 8, wherein said holder part is made of aluminum.

11. The backlight module according to claim 8, wherein an assembly angle is provided on the top of said mating portion close to one side of said light guide plate.

12. The backlight module according to claim 8, wherein a hook engagement portion is provided on one side of said mating portion away from said light guide plate, and a hook groove is provided on the part of said inverted U-shaped groove away from said light guide plate, and said hook groove hooked with said hook engagement portion.

13. The backlight module according to claim 12, wherein said one side of said mating portion away from said supporting portion matches tightly with the inner surface of said inverted U-shaped groove.

14. A frame unit using in liquid crystal display comprising:
   a holder part, which is provided with a supporting portion and a vertical portion interconnected with each other, wherein said supporting portion supports the light guide plate of said liquid crystal display, and a mating portion is disposed on one side of said vertical portion away from said supporting portion, and a mating face is provided on one side of said mating portion close to said light guide plate, and said mating face tilts from one side of said vertical portion close to said light guide plate to one side of said vertical portion away from said light guide plate; and
   an intermediate frame, wherein said light guide plate is pressed by one end of said intermediate frame close to said light guide plate, and an inverted U-shaped groove is provided on the part of said intermediate frame close to said holder part, and said mating portion is disposed in said inverted U-shaped groove, and said mating face abuts on the inner surface of said inverted U-shaped groove close to one side of said light guide plate.

15. The frame unit according to claim 14, wherein said mating face is flat or curved.

16. The frame unit according to claim 14, wherein said holder part is made of aluminum.

17. The frame unit according to claim 14, wherein an assembly angle is provided on the top of said mating portion close to one side of said light guide plate.

18. The frame unit according to claim 14, wherein a hook engagement portion is provided on one side of said mating portion away from said light guide plate, and a hook groove is provided on the part of said inverted U-shaped groove away from said light guide plate, and said hook groove hooked with said hook engagement portion.

19. The frame unit according to claim 18, wherein said one side of said mating portion away from said supporting portion matches tightly with the inner surface of said inverted U-shaped groove.

* * * * *